(12) United States Patent
Walden

(10) Patent No.: US 10,017,157 B1
(45) Date of Patent: Jul. 10, 2018

(54) VEHICLE SECURITY SYSTEM

(71) Applicant: Jackie Walden, Decatur, AL (US)

(72) Inventor: Jackie Walden, Decatur, AL (US)

(*) Notice: Subject to any disclaimer, the term of this patent is extended or adjusted under 35 U.S.C. 154(b) by 0 days.

(21) Appl. No.: 15/431,931

(22) Filed: Feb. 14, 2017

(51) Int. Cl.
*B60R 25/10* (2013.01)
*B60R 25/30* (2013.01)
*B60R 25/102* (2013.01)
*B60R 25/33* (2013.01)
*B60R 25/25* (2013.01)

(52) U.S. Cl.
CPC .......... *B60R 25/305* (2013.01); *B60R 25/102* (2013.01); *B60R 25/252* (2013.01); *B60R 25/33* (2013.01); *B60R 2025/1016* (2013.01)

(58) Field of Classification Search
CPC ....... B60R 25/305; B60R 11/04; B60R 25/00; B60R 25/102; B60R 2300/105; B60R 2300/70; B60R 2325/205
See application file for complete search history.

(56) References Cited

U.S. PATENT DOCUMENTS

| 4,843,463 | A | 6/1989 | Michetti |
| 5,027,104 | A | 6/1991 | Reid |
| 5,680,123 | A | 10/1997 | Lee |
| D388,107 | S | 12/1997 | Huckins |
| 7,659,827 | B2 | 2/2010 | Gunderson |
| 7,825,780 | B2 | 11/2010 | Pitt |
| 8,928,471 | B2 * | 1/2015 | Morgan ............... G08B 21/185 |
| | | | 324/522 |
| 9,865,112 | B2 * | 1/2018 | Maiwand ........... G07C 9/00309 |
| 2005/0088521 | A1 | 4/2005 | Blanco |
| 2011/0304733 | A1 | 12/2011 | Umoh |
| 2016/0073025 | A1 | 3/2016 | Cillia |

FOREIGN PATENT DOCUMENTS

WO 2006022824 A2 3/2006

* cited by examiner

*Primary Examiner* — Omeed Alizada
(74) *Attorney, Agent, or Firm* — Kyle A. Fletcher, Esq.

(57) ABSTRACT

The vehicle security system is a personal security system adapted for use with an automobile. The vehicle security system is signaling system that is initiated through the actuation of a switch located within the interior of the automobile. Once activated, the vehicle security system initiates a security procedure that sends a continuous stream of messages to an appropriate authority. Messages sent through the security procedure contain identification information regarding the vehicle, the updated GPS coordinates of the vehicle, and a file containing an image of the current security situation. The vehicle security system further comprises a kill switch that allows the appropriate authority to disable the automobile. The vehicle security system comprises a logic module, a communication module, a GPS module, a plurality of activation switches, a plurality of cameras, and a kill switch.

19 Claims, 8 Drawing Sheets

VEHICLE SECURITY SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicles and vehicle fittings, more specifically, a system indicating unauthorized use of a vehicle further comprising a signal being sent to a remote location.

SUMMARY OF INVENTION

The vehicle security system is a personal security system adapted for use with an automobile. The vehicle security system is signaling system that is initiated through the actuation of a switch located within the interior of the automobile. Once activated, the vehicle security system initiates a security procedure that sends a continuous stream of messages to an appropriate authority. Messages sent through the security procedure contain identification information regarding the vehicle, the updated GPS coordinates of the vehicle, and a file containing an image of the current security situation. The vehicle security system further comprises a kill switch that allows the appropriate authority to disable the automobile.

These together with additional objects, features and advantages of the vehicle security system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle security system in detail, it is to be understood that the vehicle security system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle security system.

It is therefore important that the claims be regarded as including such equivalent construction insofar as they do not depart from the spirit and scope of the vehicle security system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
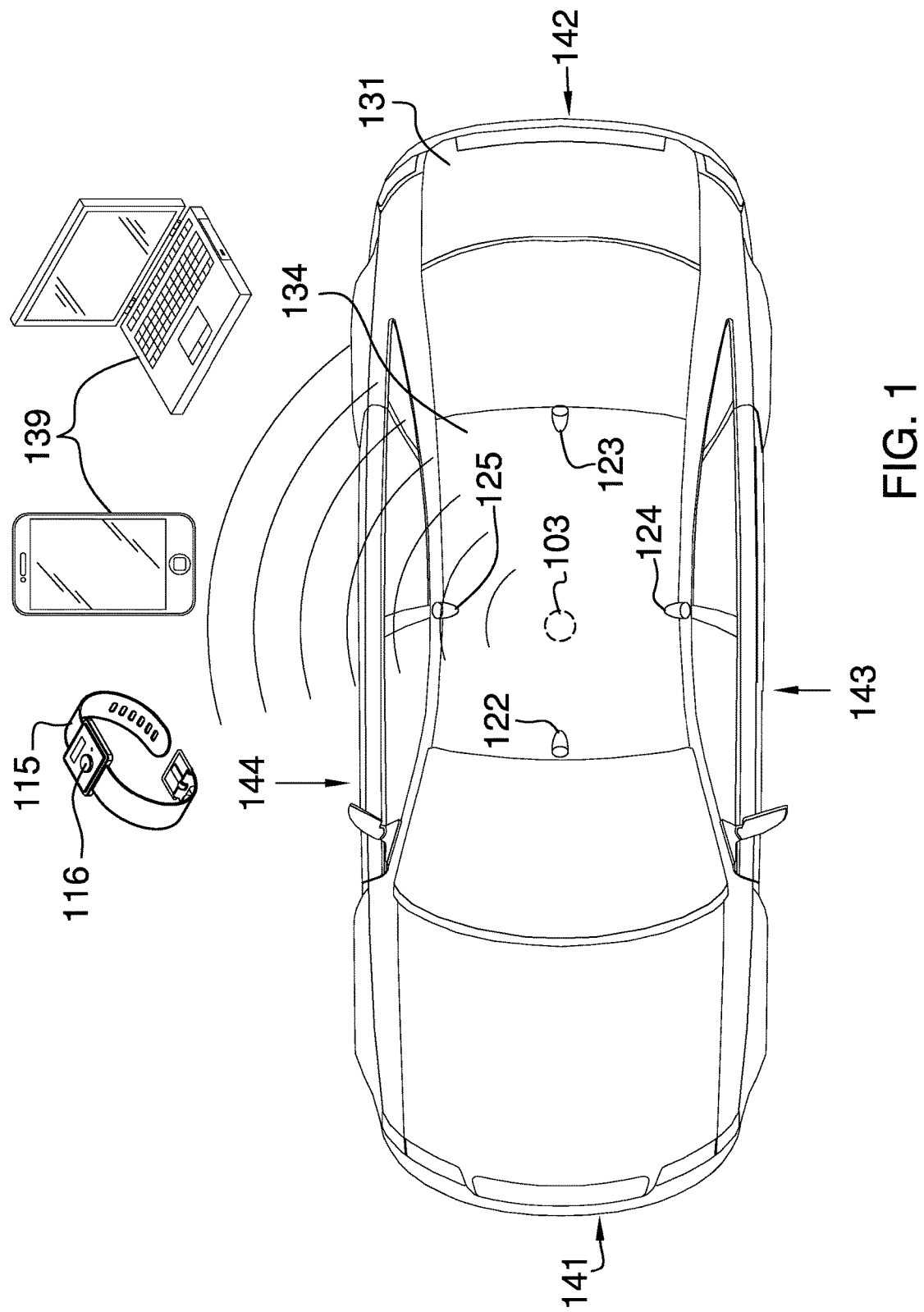
FIG. 1 is a top view of an embodiment of the disclosure.
Figure 2:
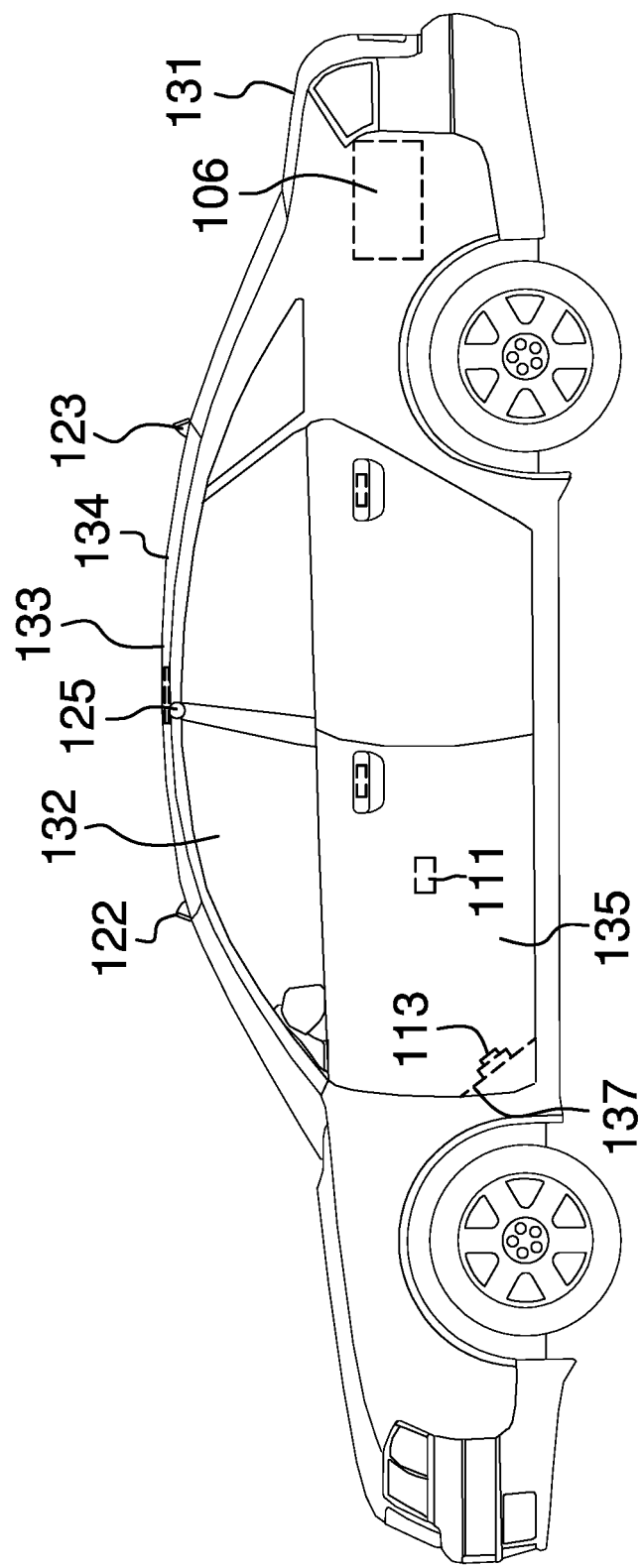
FIG. 2 is a driver's side view of an embodiment of the disclosure.
Figure 3:
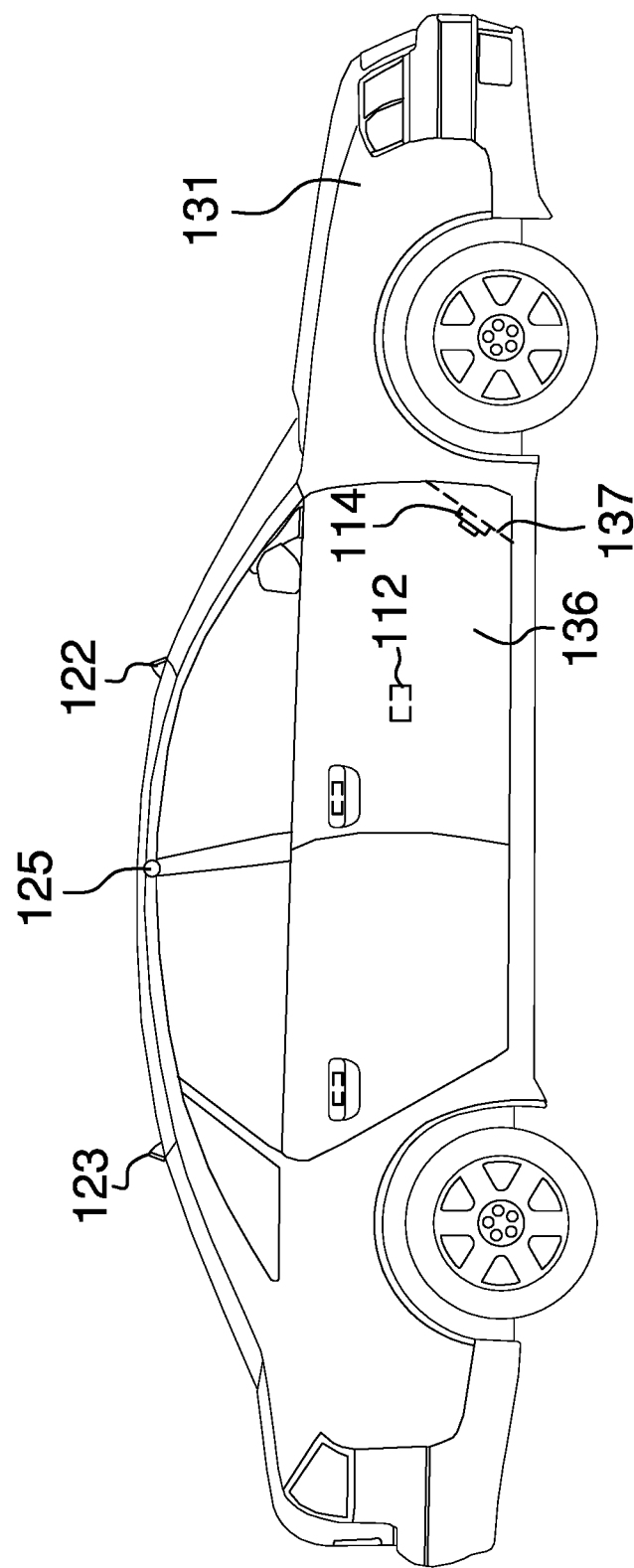
FIG. 3 is a passenger's side view of an embodiment of the disclosure.
Figure 4:
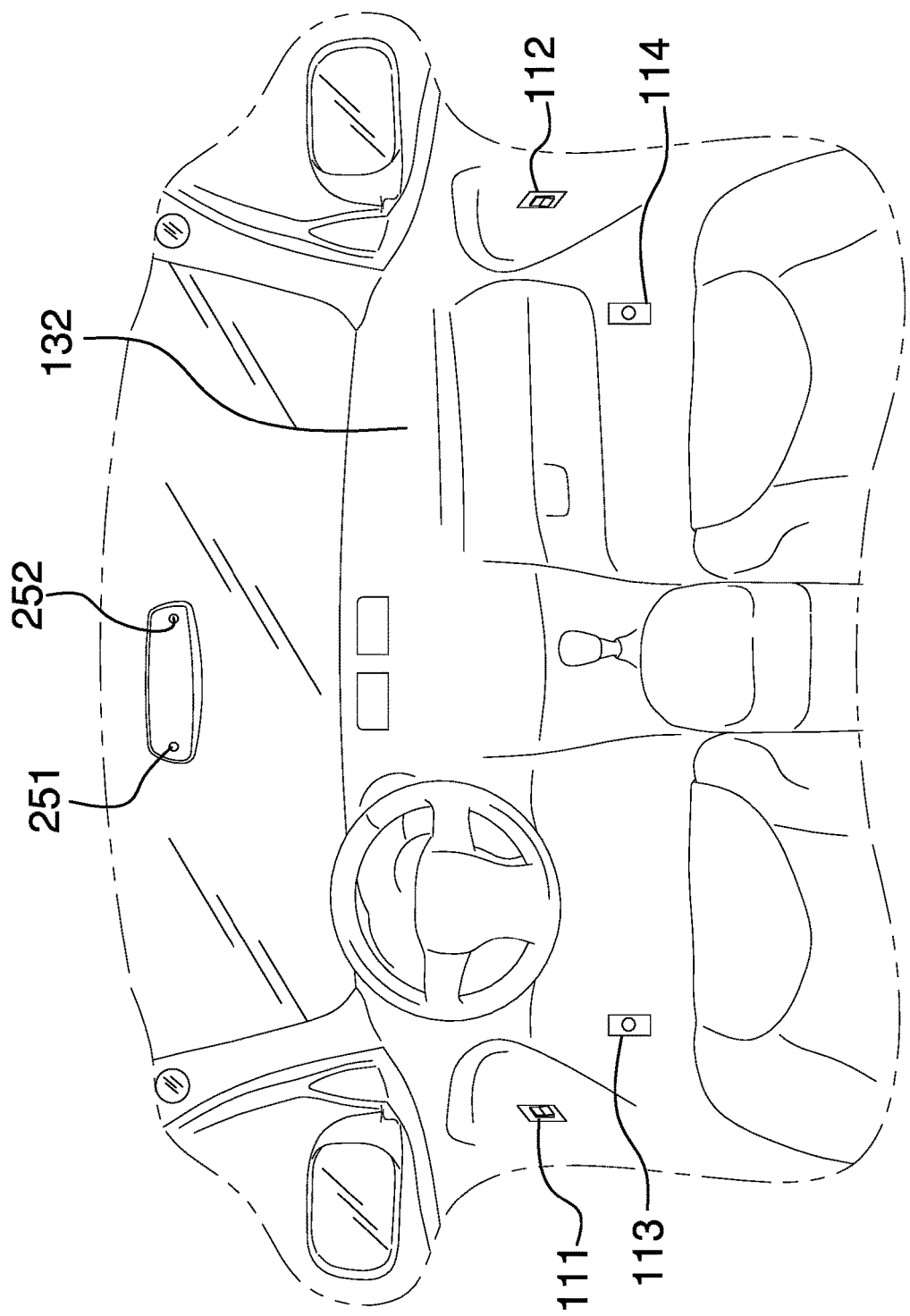
FIG. 4 is a detail view of an embodiment of the disclosure.
Figure 5:
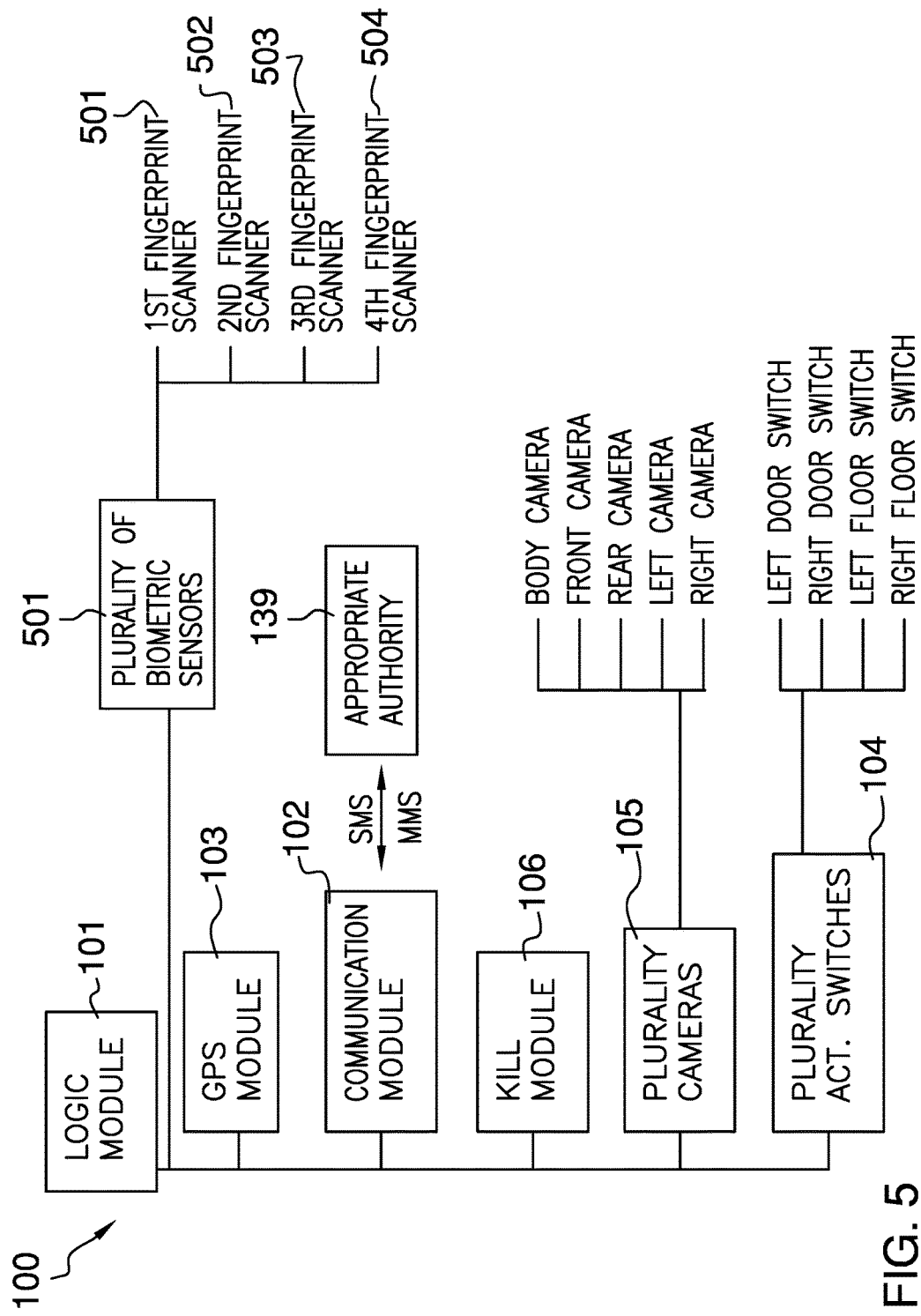
FIG. 5 is a block diagram of an embodiment of the disclosure.
Figure 6:
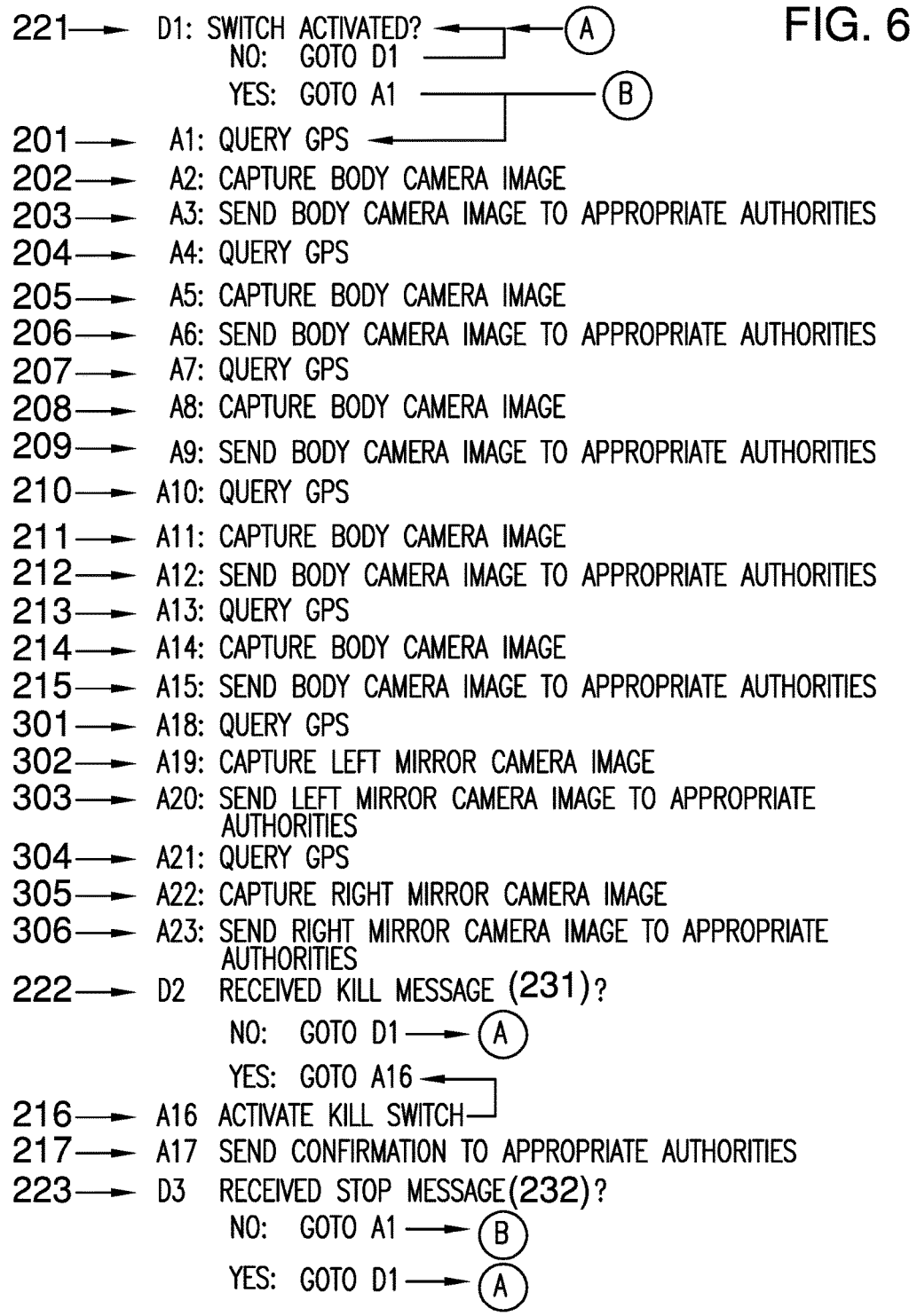
FIG. 6 is a flowchart of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 8.

The vehicle security system 100 (hereinafter invention) comprises a logic module 101, a communication module 102, a GPS module 103, a plurality of activation switches 104, a plurality of cameras 105, and a kill switch 106. The communication module 102, the GPS module 103, the plurality of activation switches 104, and the kill switch 106 are electrically connected to the logic module 101. The plurality of cameras 105 are wirelessly connected to the logic module 101. The invention 100 is a personal security system adapted for use with an automobile 131. The invention 100 is signaling system that is initiated through the actuation of an activation switch selected from the plurality of activation switches 104. Each of the plurality of activation switches 104 is located within the interior 132 of the automobile 131. Once an activation switch selected from the plurality of activation switches 104 is activated, the invention 100 initiates a security procedure 200 that sends a continuous stream of communications to an appropriate authority 139. Each communication sent through the security procedure 200 contains identification information regarding the vehicle and the updated GPS coordinates of the automobile 131. Each of the plurality of cameras 105 is a wirelessly connected camera that captures a series of images that are processed by the logic module 101 and that are incorporated into selected communications sent to the appropriate authority 139. The invention 100 further comprises a kill switch 106 that allows the appropriate authority 139 to disable the automobile 131.

The logic module 101 is a readily and commercially available programmable electronic device that is used to manage, regulate, and operate the invention 100. The communication module 102 is a readily and commercially available wireless electronic communication device that allows the logic module 101 to exchange messages with the appropriate authorities. In the first potential embodiment of the disclosure, the communication module 102 communicates SMS and MMS messages between the logic module 101 and the appropriate authority 139 through a commercially provided and publically available cellular wireless network. The use of a commercially provided and publically available cellular wireless network is preferred because: 1) of its low cost; 2) of its widespread availability and broad interoperability between competing publically available wireless networks; and, 3) methods and techniques to send SMS and MMS messages over a publically available wireless network are well known and documented by those skilled in the electrical arts. The GPS module 103 is a commercially available electrical device that communicates with the GPS to determine the GPS coordinates of the GPS module 103. When queried by the logic module 101, the GPS module 103 transfers the GPS coordinates of the GPS module 103 to the logic module 101.

Each of the plurality of activation switches 104 is a normally open momentary switch. The plurality of activation switches 104 are positioned within the interior 132 of the automobile 131. The closure of any activation switch selected from the plurality of activation switches 104 signals the logic module 101 to initiate the security procedure 200. The plurality of activation switches 104 comprises a left door switch 111, a right door switch 112, a left floor switch 113, and a right floor switch 114. The left door switch 111 is located in interior 132 side of the front driver's side door 135 of the automobile 131. The right door switch 112 is located in interior 132 side of the front passenger's side door 136 of the automobile 131. The left floor switch 113 is located in the front floor board 137. The right floor switch 114 is located in the front floor board 137.

The plurality of cameras 105 comprises a body camera 121, a front camera 122, a rear camera 123, a left camera 124, a right camera 125, a left mirror camera 126, and a right mirror camera 127. The front camera 122 is located on the exterior 133 side of the roof 134 of the automobile 131 such that the front camera 122 captures images from the front side 141 of the automobile 131. The rear camera 123 is located on the exterior 133 side of the roof 134 of the automobile 131 such that the rear camera 123 captures images from the rear side 142 of the automobile 131. The left camera 124 is located on the exterior 133 side of the roof 134 of the automobile 131 such that the left camera 124 captures images from the left side 143 of the automobile 131. The right camera 125 is located on the exterior 133 side of the roof 134 of the automobile 131 such that the right camera 125 captures images from the right side 144 of the automobile 131. The left mirror camera 126 is located on the rear view mirror 401 of the windshield 402 of the automobile 131 such that the left mirror camera 126 captures images of the occupant of the driver's seat 403 of the automobile 131. The right mirror camera 127 is located on the rear view mirror 401 of the windshield 402 of the automobile 131 such that the right mirror camera 127 captures images of the occupant of the front passenger seat 403 of the automobile 131.

Figure 7:
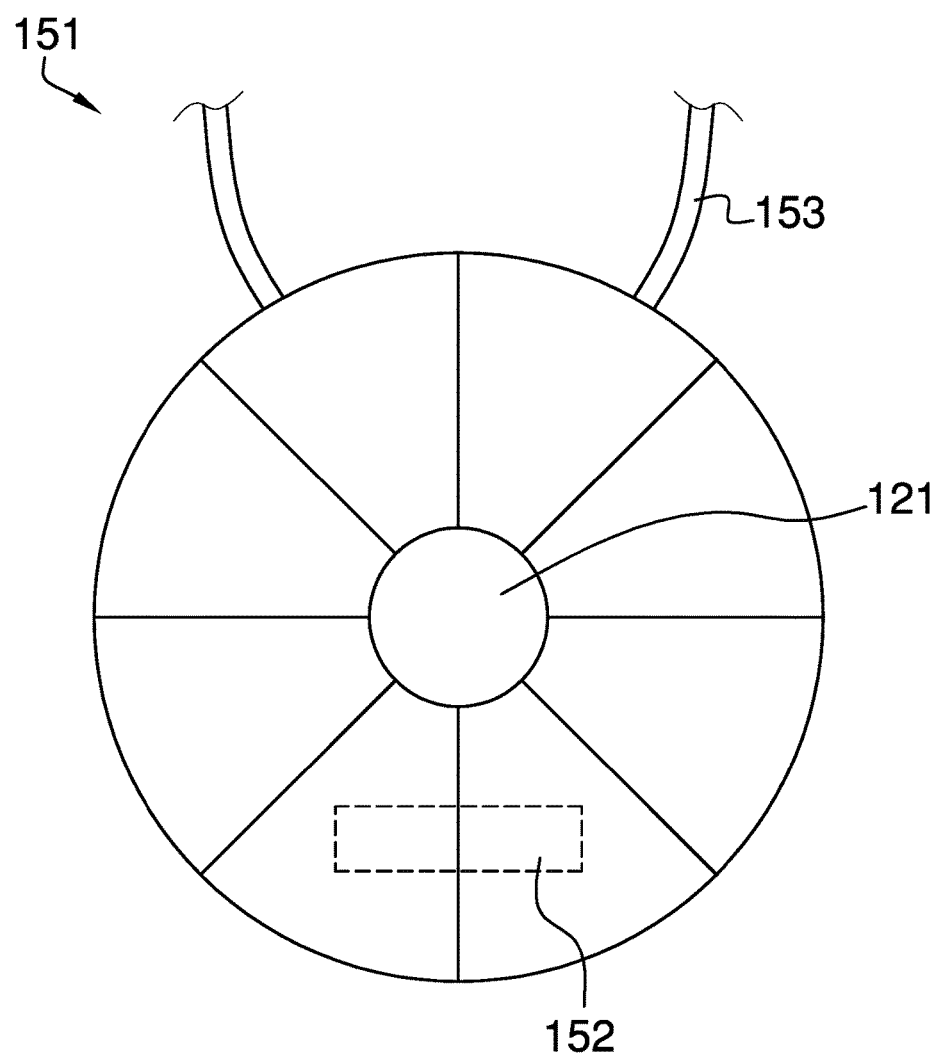
FIG. 7 is a detail view of an embodiment of the disclosure.
Figure 8:
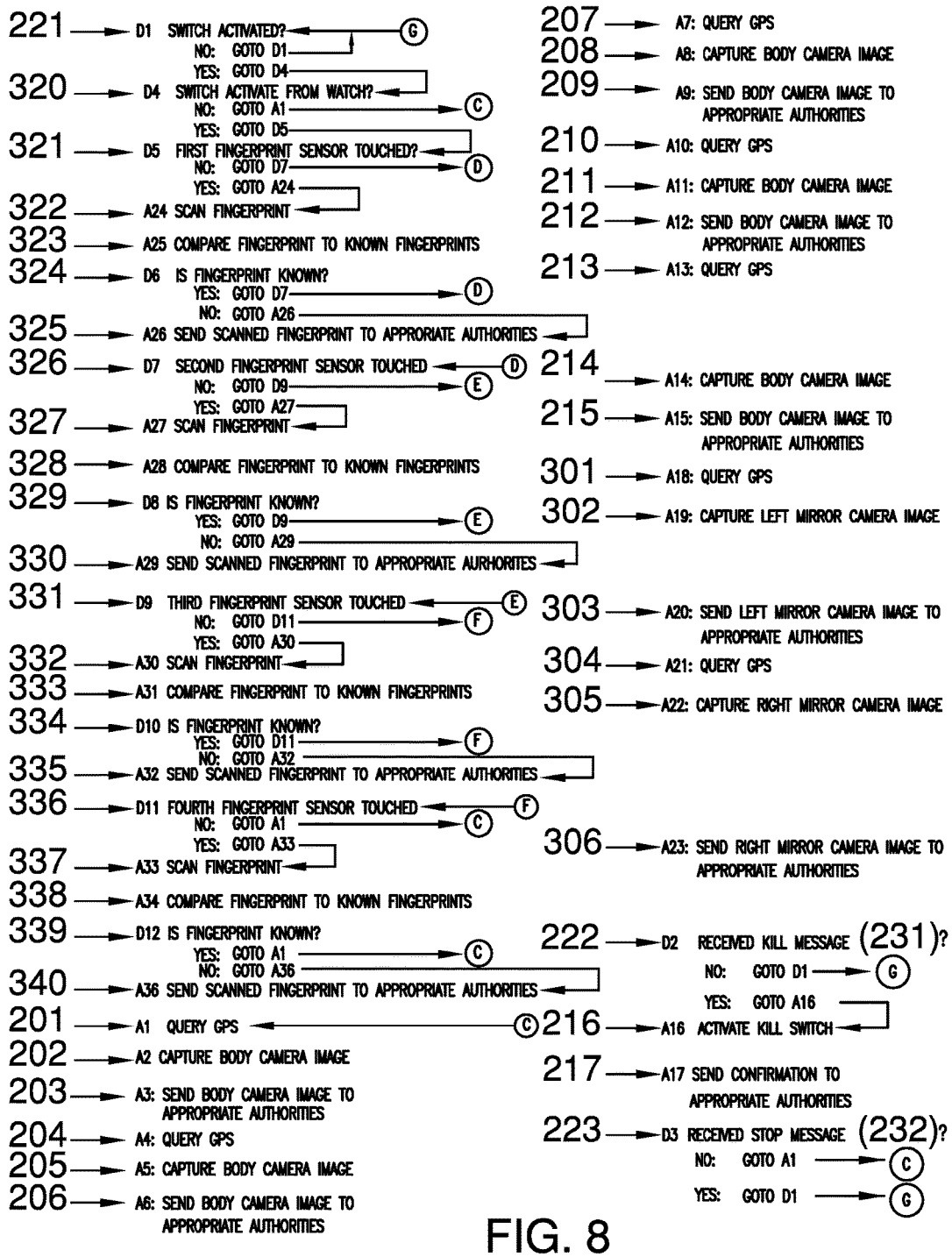
FIG. 8 is a flowchart of an embodiment of the disclosure.

As shown most clearly in FIG. 7, the body camera 121 is mounted in an accessory 151, such as a necklace 153, pendant or other jewelry that is worn while using the automobile 131.

The kill switch 106 is an electrical device that is controlled by the logic module 101. When activated by the logic module 101, the kill switch 106 temporarily disables the automobile 131 in a manner that brings the automobile 131 to a stop. The activation of the kill switch 106 can only be initiated by the appropriate authority 139 through a first message 231 that is sent to the logic module 101 through the communication module 102. The operation of the kill switch 106 is discussed in more detail elsewhere in this disclosure.

The body camera 121 is powered from a battery 152 that is incorporated into the accessory 151. The balance of the invention 100 is powered through the automobile 131 electrical system.

The security procedure 200 is a term that is intended to describe the operation of the invention 100. The security procedure 200 is described in detail in this paragraph and the following seven paragraphs. The logic module 101 makes a first decision 221 to determine whether a switch selected from the plurality of activation switches 104 has been actuated. If a switch selected from the plurality of activation switches 104 has been actuated the logic module 101 proceeds to a first action 201. If a switch selected from the plurality of activation switches 104 has not been actuated the logic module 101 loops back to the first decision 221.

The logic module 101 takes the first action 201 of querying the GPS module 103 to update the GPS coordinates of the automobile 131. The logic module 101 next takes a second action 202 of capturing and processing an image from the body camera 121. The logic module 101 next takes a third action 203 of using the communication module 102 to send a communication containing identification information, the current GPS location, and the body camera 121 image to the appropriate authorities.

The logic module 101 next takes a fourth action 204 of querying the GPS module 103 to update the GPS coordinates of the automobile 131. The logic module 101 next takes a fifth action 205 of capturing and processing an image from the front camera 122. The logic module 101 next takes a sixth action 206 of using the communication module 102 to send a communication containing identification information, the current GPS location, and the front camera 122 image to the appropriate authorities.

The logic module 101 next takes a seventh action 207 of querying the GPS module 103 to update the GPS coordinates of the automobile 131. The logic module 101 next takes an eighth action 208 of capturing and processing an image from the rear camera 123. The logic module 101 next takes a ninth action 209 of using the communication module 102 to send a communication containing identification information, the current GPS location, and the rear camera 123 image to the appropriate authorities.

The logic module 101 next takes a tenth action 210 of querying the GPS module 103 to update the GPS coordinates of the automobile 131. The logic module 101 next takes an eleventh action 211 of capturing and processing an image from the left camera 124. The logic module 101 next takes a twelfth action 212 of using the communication module 102 to send a communication containing identification information, the current GPS location, and the left camera 124 image to the appropriate authorities.

The logic module 101 next takes a thirteenth action 213 of querying the GPS module 103 to update the GPS coordinates of the automobile 131. The logic module 101 next takes a fourteenth action 214 of capturing and processing an image from the right camera 125. The logic module 101 next takes a fifteenth action 215 of using the communication module 102 to send a communication containing identification information, the current GPS location, and the right camera 125 image to the appropriate authorities.

The logic module 101 next takes an eighteenth action 301 of querying the GPS module 103 to update the GPS coordinates of the automobile 131. The logic module 101 next takes a nineteenth action 302 of capturing and processing an image from the left mirror camera 126. The logic module 101 next takes a twentieth action 303 of using the communication module 102 to send a communication containing identification information, the current GPS location, and the left mirror camera 126 image to the appropriate authorities.

The logic module 101 next takes a twenty first action 304 of querying the GPS module 103 to update the GPS coordinates of the automobile 131. The logic module 101 next takes a twenty second action 305 of capturing and processing an image from the right mirror camera 127. The logic module 101 next takes a twenty third action 306 of using the communication module 102 to send a communication containing identification information, the current GPS location, and the right mirror camera 127 image to the appropriate authorities.

The logic module 101 next makes a second decision 222 to determine if a first message 231 requesting the activation of the kill switch 106 has been received via the communication module 102. If the first message 231 has been received, the logic module 101 takes a sixteenth action 216 of activating the kill switch 106. The logic module 101 then takes a seventeenth action 217 of using the communication module 102 to send a communication containing identification information, the current GPS location, and a confirmation that the kill switch 106 has been activated to the appropriate authorities. The logic module 101 then proceeds to a third decision 223. If the first message 231 has not been received, the logic module 101 proceeds directly to the third decision 223.

The logic module 101 makes a third decision 223 to determine whether the communication module 102 has received a second message 232 terminating the operation of the invention 100. If the second message 232 has been received then logic module 101 then loops back to the first decision 221. If such a second message 232 has not been received has been received the logic module 101 loops back to the first decision 221.

In the first potential embodiment of the disclosure, the logic module 101 is an Arduino microcontroller. The communication module 102 and the GPS module 103 are shields compatible with the Arduino system. Each of the plurality of cameras 105 is a commercially available wireless camera. The plurality of cameras 105 further comprises the Arduino shields necessary to integrate the plurality of cameras 105 with the logic module 101. Each of the plurality of activation switches 104 are readily and commercially available. The kill switch 106 is a commercially available wireless solenoid valve that installed in the fuel line of the automobile 131 such that when the kill switch 106 is activated the solenoid valve closes and the fuel supply to the engine is cut off. The logic module 101, the communication module 102, and the GPS module 103 are mounted behind the dashboard 138 of the automobile 131. The locations of the plurality of activation switches 104 and the plurality of cameras 105 are discussed elsewhere in this disclosure. The methods and techniques to implement and fabricate the invention 100 as described in this paragraph are well known by those skilled in the electrical arts or the automotive arts.

In a second potential embodiment of the disclosure, the invention 100 further comprises a watch 115 and a plurality of biometric sensors 501. The watch 115 further comprises a watch switch 116. The watch 115 is a commercially available watch, commonly marketed as a smart watch that communicates to the communication module 103 and the logic module 101 through SMS messages sent over a publically available cellular network. The watch switch 116 is included as an activation switch contained within the plurality of activation switches 104. When the watch switch 116 is activated the SMS message to the logic module 101 will initiate the operation of the security procedure 200. Modifications to the security procedure 200 are described in the next paragraph. Each of the plurality of biometric sensors 501 is a readily and commercially available fingerprint scanner that is mounted in the handle of a door of the automobile 131. To enable the second potential embodiment of the disclosure, the logic module 101 is loaded with the finger print pattern of each authorized user of the automobile 131. When the security procedure 200 is activated, when the handle of a door of the automobile 131 is touched the logic module 101 receives an image of the fingerprint pattern that touched the door handle. If the fingerprint pattern does not match an authorized fingerprint, the logic module 101 sends the fingerprint pattern through the communication module 103 forwarded to the appropriate authority 139 for identification. In the second potential embodiment of the disclosure, the plurality of biometric sensors 500 comprises a first fingerprint sensor 501, a second fingerprint sensor 502, a third fingerprint sensor 503 and a fourth fingerprint sensor 504.

In the second potential embodiment of the disclosure, the operation of the security protocol 200 is modified as describe in this paragraph.

If as a result of the first decision 221, it is determined that a switch was activated, the logic module 101 makes a fourth decision 320 to determine if the switch activation came from the watch 115. If the switch activation did not come from the watch 115, then the logic module 101 proceeds to the first action 201 and proceeds as described elsewhere in this disclosure. If the switch activation came from the watch 115 then the logic module 101 makes a fifth decision 321 to determine if the first fingerprint sensor 501 was touched. If the first fingerprint sensor 501 was not touched then the logic module 101 proceeds to the seventh decision 326. If the first fingerprint sensor 501 was touched then the logic module 101 takes a twenty fourth action 322 of having the first fingerprint sensor 501 scan the fingerprint. The logic module 101 takes a twenty fifth action 232 to compare the scanned fingerprint against the authorized fingerprints. The logic module 101 makes a sixth decision 326 to determine if the scanned fingerprint matches an authorized fingerprint. If the fingerprint is authorized, then the logic module 101 proceeds to the seventh decision 326. If the fingerprint is not authorized, then the logic module 101 takes a twenty sixth action 325 of sending the fingerprint pattern to the appropriate authority 139 and proceeds to the seventh decision 326. The logic module 101 makes a seventh decision 326 to determine if the second fingerprint sensor 502 was touched. If the second fingerprint sensor 502 was not touched then the logic module 101 proceeds to the ninth decision 331. If the second fingerprint sensor 502 was touched then the logic module 101 takes a twenty seventh action 327 of having the second fingerprint sensor 502 scan the fingerprint. The logic module 101 takes a twenty eighth action 328 to compare the scanned fingerprint against the authorized fingerprints. The logic module 101 makes an eighth decision 329 to determine if the scanned fingerprint matches an authorized fingerprint. If the fingerprint is authorized, then the logic module 101 proceeds to the ninth decision 331. If the fingerprint is not authorized, then the logic module 101 takes a twenty ninth action 330 of sending the fingerprint pattern to the appropriate authority 139 and then proceeds to the ninth decision 331. The logic module 101 makes a ninth decision 331 to determine if the third fingerprint sensor 503 was touched. If the third fingerprint sensor 503 was not touched then the logic module 101 proceeds to an eleventh decision 336. If the second fingerprint sensor 502 was touched then the logic module 101 takes a thirtieth action 332 of having the third fingerprint sensor 503 scan the fingerprint. The logic module 101 takes a thirty first action 333 to compare the scanned fingerprint against the authorized fingerprints. The logic module 101 makes an tenth decision 334 to determine if the scanned fingerprint matches an authorized fingerprint. If the fingerprint is authorized, then the logic module 101 proceeds to the eleventh decision 336. If the fingerprint is not authorized, then the logic module 101 takes a thirty second action 335 of sending the fingerprint pattern to the appropriate authority 139 and then proceeds to the eleventh decision 336.

The logic module 101 makes an eleventh decision 336 to determine if the fourth fingerprint sensor 504 was touched. If the fourth fingerprint sensor 504 was not touched then the logic module 101 proceeds to the first action 201. If the fourth fingerprint sensor 504 was touched then the logic module 101 takes a thirty third action 337 of having the fourth fingerprint sensor 504 scan the fingerprint. The logic module 101 takes a thirty fourth action 338 to compare the scanned fingerprint against the authorized fingerprints. The logic module 101 makes an twelfth decision 339 to determine if the scanned fingerprint matches an authorized fingerprint. If the fingerprint is authorized, then the logic module 101 proceeds to the first action 201. If the fingerprint is not authorized, then the logic module 101 takes a thirty sixth action 340 of sending the fingerprint pattern to the appropriate authority 139 and then proceeds to the first action 201.

The following definitions were used in this disclosure:

Accessory: As used in this disclosure, an accessory is an object that adds to the convenience or attractiveness of, but is not required for the use of, a basic clothing set.

Appropriate Authority: As used in this disclosure, an appropriate authority is person or organization that is designated to receive alarm or other notification messages regarding a monitored system or activity.

Automobile: As used in this disclosure, an automobile is a road vehicle that that specializes in carrying passengers and light cargo loads. This definition is specifically intended to include vehicles generally referred to as pickup trucks, vans, minivans, and sport utility vehicles.

Camera: As used in this disclosure, a camera is a sensor that converts light into electric signals that encode and records the spatial orientation of the captured light in a manner that reproduces the images seen by a human eye.

Exterior: As used in this disclosure, the exterior is use as a relational term that implies that an object is not contained within the boundary of a structure or a space.

GPS: As used in this disclosure, depending on the context GPS refers to: 1) a system of navigational satellites that are used to determine the position and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System.

Interior: As used in this disclosure, the interior is use as a relational term that implies that an object is contained within the boundary of a structure or a space.

Logic Module: As used in this disclosure, a logic module is an electrical device that is programmable and that accepts digital and analog inputs, processes the digital and analog inputs according to previously stored instruction and provides the results of these instructions as digital or analog outputs.

Microcontroller: As used in this disclosure, a microcontroller is a small computer, often on a single integrated circuit, containing a processor core, memory, and programmable input/output peripherals.

Momentary Switch: As used in this disclosure, a momentary switch is a biased switch in the sense that the momentary switch has a baseline position that only changes when the momentary switch is actuated (for example when a pushbutton switch is pushed). The momentary switch then returns to the baseline position once the actuation is completed. This baseline position is called the "normal" position. So for example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services, which is abbreviated as MMS.

Solenoid: As used in this disclosure, a solenoid is a cylindrical coil of electrical wire that generates a magnetic field that can be used to mechanically move a shaft made of a magnetic core.

Solenoid Valve: As used in this disclosure, a solenoid valve is an electromechanically controlled valve that is used to control fluid or gas flow. A two port solenoid valve opens or closes to fluid flow through the valve portion of the solenoid valve. A three port solenoid valve switched fluid or gas flow between a first port and a second port to either feed or be fed from a third port.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transceiver: As used in this disclosure, a transceiver is a device that is used to transmit and receive radio signals.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicle fitting comprising:
a logic module, a communication module, a GPS module, a plurality of activation switches, a plurality of cameras, and a kill switch;
wherein the communication module, the GPS module, the plurality of activation switches, and the kill switch are electrically connected to the logic module;
wherein the plurality of cameras are wirelessly connected to the logic module;
wherein the vehicle fitting is a personal security system installed in an automobile;
wherein the vehicle fitting is signaling system; wherein the signaling system is initiated through the actuation of an activation switch selected from the plurality of activation switches;
wherein each of the plurality of activation switches is located within the interior of the automobile;
wherein once an activation switch selected from the plurality of activation switches is activated, the vehicle fitting initiates a security procedure that sends a continuous stream of communications to an appropriate authority;
wherein each communication sent through the security procedure contains identification information regarding the vehicle and the updated GPS coordinates of the automobile;
wherein each of the plurality of cameras captures a series of images that are processed by the logic module;
wherein the images selected from the captured series of images are incorporated into communications sent to the appropriate authority;
wherein the kill switch enables the appropriate authority to disable the automobile;
wherein vehicle fitting further comprises a watch and a plurality of biometric sensors;
wherein the watch further comprises a watch switch;
wherein the watch switch is incorporated as an activation switch contained within the plurality of activation switches;
wherein when the watch switch is activated an SMS message to the logic module will initiate the operation of the security procedure;
wherein the logic module makes a decision to determine if the switch activation came from the watch;
wherein each of the plurality of biometric sensors is a fingerprint scanner that is mounted in the a door of the automobile; and
wherein the logic module is loaded with one or more authorized fingerprint patterns of each authorized user of the automobile.

2. The vehicle fitting according to claim 1
wherein the logic module is a programmable electronic device;
wherein the communication module is a wireless electronic communication device that allows the logic module to exchange messages with the appropriate authorities;
wherein the GPS module is an electronic device that communicates with the GPS to determine the GPS coordinates of the GPS module;
wherein the GPS module transfers the GPS coordinates of the GPS module to the logic module.

3. The vehicle fitting according to claim 2
wherein each of the plurality of activation switches is a normally open momentary switch;
wherein the plurality of activation switches are positioned within the interior of the automobile.

4. The vehicle fitting according to claim 3
wherein the plurality of activation switches comprises a left door switch, a right door switch, a left floor switch, and a right floor switch;
wherein the left door switch is located in interior side of the front driver's side door of the automobile;
wherein the right door switch is located in interior side of the front passenger's side door of the automobile;
wherein the left floor switch is located in the front floor board;
wherein the right floor switch is located in the front floor board.

5. The vehicle fitting according to claim 4
wherein the plurality of cameras comprises a front camera, a rear camera, a left camera, a right camera, a left mirror camera, and a right mirror camera;
wherein the front camera is located on the exterior side of the roof of the automobile such that the front camera captures images from the front side of the automobile;
wherein the rear camera is located on the exterior side of the roof of the automobile such that the rear camera captures images from the rear side of the automobile;
wherein the left camera is located on the exterior side of the roof of the automobile such that the left camera captures images from the left side of the automobile;
wherein the right camera is located on the exterior side of the roof of the automobile such that the right camera captures images from the right side of the automobile;
wherein the left mirror camera is located on the rear view mirror of the windshield of the automobile such that the left mirror camera captures images of the driver's seat of the automobile;
wherein the right mirror camera is located on the rear view mirror of the windshield of the automobile such that the right mirror camera captures images of the front passenger seat of the automobile.

6. The vehicle fitting according to claim 5
wherein the plurality of cameras comprises a body camera, a front camera, a rear camera, a left camera, and a right camera;
wherein the body camera is mounted in an accessory.

7. The vehicle fitting according to claim 6
wherein the kill switch is an electrical device;
wherein the kill switch is activated by the logic module;
wherein the kill switch is a solenoid valve that installed in the fuel line of the automobile.

8. The vehicle fitting according to claim 7
wherein the body camera is powered from a battery that is incorporated into the accessory;
wherein the balance of the vehicle fitting is powered through the automobile electrical system.

9. The vehicle fitting according to claim 8 wherein the communication module communicates SMS and MMS messages between the logic module and the appropriate authority through a commercially provided and publically available cellular wireless network.

10. The vehicle fitting according to claim 1
wherein the communication module is a wireless electronic communication device that allows the logic module to exchange messages with the appropriate authorities;
wherein the GPS module is an electronic device that communicates with the GPS to determine the GPS coordinates of the GPS module.

11. The vehicle fitting according to claim 10
wherein the kill switch is an electrical device;
wherein the kill switch is activated by the logic module.

12. The vehicle fitting according to claim 11
wherein the plurality of cameras comprises a front camera, a rear camera, a left camera, a right camera, a left mirror camera, and a right mirror camera;
wherein the front camera is located on the exterior side of the roof of the automobile such that the front camera captures images from the front side of the automobile;
wherein the rear camera is located on the exterior side of the roof of the automobile such that the rear camera captures images from the rear side of the automobile;
wherein the left camera is located on the exterior side of the roof of the automobile such that the left camera captures images from the left side of the automobile;
wherein the right camera is located on the exterior side of the roof of the automobile such that the right camera captures images from the right side of the automobile;
wherein the left mirror camera is located on a rear view mirror of the automobile such that the left mirror camera captures images from the interior of the automobile;
wherein the right mirror camera is located on a rear view mirror of the automobile such that the right mirror camera captures images from the interior of the automobile;
wherein the body camera is mounted in an accessory.

13. The vehicle fitting according to claim 12
wherein each of the plurality of activation switches is a normally open momentary switch;
wherein the plurality of activation switches are positioned within the interior of the automobile.

14. The vehicle fitting according to claim 13
wherein the plurality of activation switches comprises a left door switch, a right door switch, a left floor switch, and a right floor switch;
wherein the left door switch is located in interior side of the front driver's side door of the automobile;
wherein the right door switch is located in interior side of the front passenger's side door of the automobile;
wherein the left floor switch is located in the front floor board;
wherein the right floor switch is located in the front floor board.

15. The vehicle fitting according to claim 14
wherein the logic module is a microcontroller;
wherein the logic module makes a first decision to determine whether a switch selected from the plurality of activation switches has been actuated;
wherein the logic module takes the first action of querying the GPS module to update the GPS coordinates of the automobile;
wherein the logic module takes a second action of capturing and processing an image from the body camera;
wherein the logic module takes a third action of using the communication module to send a communication containing identification information, the current GPS location, and the body camera image to the appropriate authorities;
wherein the logic module takes a fourth action of capturing and processing an image from the front camera;
wherein the logic module takes a fifth action of using the communication module to send a communication containing identification information, the current GPS location, and the front camera image to the appropriate authorities;
wherein the logic module takes a sixth action of capturing and processing an image from the rear camera;
wherein the logic module takes a seventh action of using the communication module to send a communication containing identification information, the current GPS location, and the rear camera image to the appropriate authorities;
wherein the logic module takes an eighth action of capturing and processing an image from the left camera;
wherein the logic module takes a ninth action of using the communication module to send a communication containing identification information, the current GPS location, and the left camera image to the appropriate authorities;
wherein the logic module next a tenth action of capturing and processing an image from the right camera;
wherein the logic module takes an eleventh action of using the communication module to send a communication containing identification information, the current GPS location, and the right camera image to the appropriate authorities;
wherein the logic module next a twelfth action of capturing and processing an image from the left mirror camera;
wherein the logic module takes an thirteenth action of using the communication module to send a communication containing identification information, the current GPS location, and the left mirror camera image to the appropriate authorities;
wherein the logic module next a fourteenth action of capturing and processing an image from the right mirror camera;
wherein the logic module takes an fifteenth action of using the communication module to send a communication containing identification information, the current GPS location, and the left mirror camera image to the appropriate authorities;
wherein the logic module makes a second decision to determine if a first message requesting the activation of the kill switch has been received by the communication module;
wherein the logic module takes a twelfth action of activating the kill switch;
wherein the logic module takes a thirteenth action of using the communication module to send a communication containing identification information, the current GPS location, and a confirmation that the kill switch has been activated to the appropriate authorities.

16. The vehicle fitting according to claim 15 wherein the kill switch is a solenoid valve that installed in the fuel line of the automobile.

17. The vehicle fitting according to claim 16 wherein the communication module communicates SMS and MMS messages between the logic module and the appropriate authority through a commercially provided and publically available cellular wireless network.

18. The vehicle fitting according to claim 17
wherein the body camera is powered from a battery that is incorporated into the accessory;
wherein the balance of the vehicle fitting is powered through the automobile electrical system.

19. The vehicle fitting according to claim 18
the vehicle fitting further comprises a watch and a plurality of biometric sensors;
wherein the watch further comprises a watch switch;
wherein the watch switch is incorporated as an activation switch contained within the plurality of activation switches;
wherein when the watch switch is activated an SMS message to the logic module will initiate the operation of the security procedure;
wherein each of the plurality of biometric sensors is a fingerprint scanner that is mounted in the a door of the automobile;
wherein the logic module is loaded with one or more authorized fingerprint patterns of each authorized user of the automobile;
wherein the plurality of biometric sensors comprises a first fingerprint sensor, a second fingerprint sensor, a third fingerprint sensor and a fourth fingerprint sensor;
wherein the logic module makes a fourth decision to determine if the switch activation came from the watch;
wherein the logic module makes a fifth decision to determine if the first fingerprint sensor was touched;
wherein the logic module takes a sixteenth action of having the first fingerprint sensor scan a first fingerprint;
wherein the logic module takes a seventeenth action to compare the scanned first fingerprint against the authorized fingerprint patterns;
wherein the logic module makes a sixth decision to determine if the scanned first fingerprint matches an authorized fingerprint;
wherein then the logic module takes an eighteenth action of sending the scanned first fingerprint pattern to the appropriate authority;
wherein the logic module makes a seventh decision to determine if the second fingerprint sensor was touched;
wherein if the second fingerprint sensor was touched then the logic module takes a nineteenth action of having the second fingerprint sensor scan a second fingerprint;
wherein the logic module takes a twentieth action to compare the scanned second fingerprint against the authorized fingerprint patterns;
wherein the logic module makes an eighth decision to determine if the scanned second fingerprint matches an authorized fingerprint;
wherein the logic module takes a twenty first action of sending the second fingerprint pattern to the appropriate authority;
wherein the logic module makes a ninth decision to determine if the third fingerprint sensor was touched;
wherein the logic module takes a twenty second action of having the third fingerprint sensor scan a third fingerprint;
wherein the logic module takes a twenty third action to compare the scanned third fingerprint against the authorized fingerprint patterns;
wherein the logic module makes an tenth decision to determine if the scanned third fingerprint matches an authorized fingerprint;
wherein the logic module takes a twenty fourth action of sending the fingerprint pattern to the appropriate authority;
the logic module makes an eleventh decision to determine if the fourth fingerprint sensor was touched;
wherein if the fourth fingerprint sensor was touched then the logic module takes a twenty fifth action of having the fourth fingerprint sensor scan a fourth fingerprint;
wherein the logic module takes a twenty sixth fourth action to compare the scanned fourth fingerprint against the authorized fingerprints;
wherein the logic module makes a twelfth decision to determine if the scanned fourth fingerprint matches an authorized fingerprint;
wherein the logic module takes a twenty sixth action of sending the fingerprint pattern to the appropriate.

* * * * *